(12) United States Patent
Bailie

(10) Patent No.: US 6,944,605 B2
(45) Date of Patent: Sep. 13, 2005

(54) EXPERT SYSTEM AND METHOD FOR CREATING AN EMBROIDERED FABRIC

(76) Inventor: Brian D. Bailie, 9913 Toltec NE., Albuquerque, NM (US) 87111

( * ) Notice: Subject to any disclaimer, the term of this patent is extended or adjusted under 35 U.S.C. 154(b) by 324 days.

(21) Appl. No.: 10/081,945

(22) Filed: Feb. 22, 2002

(65) Prior Publication Data

US 2003/0023574 A1 Jan. 30, 2003

Related U.S. Application Data

(60) Provisional application No. 60/271,285, filed on Feb. 23, 2001.

(51) Int. Cl.[7] .............................. G06N 5/02; G06F 17/00
(52) U.S. Cl. ............................... 706/47; 706/46; 706/14
(58) Field of Search .............................. 706/47, 46, 14

(56) References Cited

PUBLICATIONS

Shifu Chen et al, A New Generation of Intelligent Punching Environment for Computerized Embroidery, 1994, IEEE, 1063–6730/94, 692–695.*

S. Amin–Nejad et al, TMS320C40 Parallel Processor for High Speed Imaging Application, 1999, IEE, Image Processing and Its Applications, Conference Publication No 465, 429434.*

* cited by examiner

Primary Examiner—Joseph P. Hirl
(74) Attorney, Agent, or Firm—Senniger Powers

(57) ABSTRACT

A computer-implemented system and method for assisting an operator in analyzing an embroidery design which will be used by an embroidery machine to create an embroidered fabric. A knowledge base of parameters relates to embroidery designs. A rules base of rules interrelates the parameters. Selection software designates defined parameters. Analysis software applies the rules to defined parameters and generates recommended parameters as a function of the defined parameters. Comments, photographs or multimedia presentations may be provided to the operator associated with one or more of the parameters. Display software provides a display of the selected parameter, the defined parameter, the one or more recommended parameters and comments, photographs, or multimedia presentations which are a function of the parameters.

15 Claims, 3 Drawing Sheets

US 6,944,605 B2

EXPERT SYSTEM AND METHOD FOR CREATING AN EMBROIDERED FABRIC

Complete Application based on provisional Application No. 60/271,285; filed Feb. 23, 2001

COMPUTER PROGRAM LISTING APPENDIX ON CD-ROM

The file of this patent includes duplicate copies of compact disc (CD-ROM) with a read only memory file entitled ASCIIFM which is in ASCII file format. The file was created on May 16, 2002 and is a size of 18,000 bytes. This ASCII document contains the lines of code which represent an example of one possible embodiment of a Computer Program Listing for this invention. This CD-ROM and the ASCIIFM file which is contained thereon is incorporated-by-reference to this Patent Application. This Application includes references to this Computer Program Listing Appendix on CD-ROM, the lines of code and the code line numbers contained therein.

BACKGROUND OF THE INVENTION

The invention relates to a system and method for assisting an operator in creating an embroidered fabric from an embroidery design. In particular, the invention recommends a compatible combination of parameters for implementing the embroidery design as an embroidered fabric.

In order for an operator of an embroidery machine to know how well a design will sew, the operator must select various parameters which need to be compatible with each other and with the design. In order to confirm compatibility, the operator actually sews the design as a test. This process of selecting parameters and making a test design can be extremely time consuming, given that the average machine will sew at a rate of 400 stitches per minute, and designs typically contain 10,000–80,000 stitches. There is a need for a system and method which can assist the operator in selecting parameters and providing the operator guidance on the interrelationship between the selected parameters and other parameters that can affect the quality of the resulting embroidered design and on the effectiveness of producing the embroidered design. There is also a need for a system and method which minimizes or avoids the need for sewing all or part of the design as a test to determine the quality of the resulting embroidered design and the effectiveness of the embroidery process.

SUMMARY OF THE INVENTION

In one form, the invention comprises computer-implemented system for assisting an operator in analyzing embroidery design which will be used by an embroidery machine to create an embroidered fabric. A knowledge base contains a plurality of parameters which relate to embroidery designs and the process of making an embroidered fabric from an embroidery design. A rules base of rules interrelates two or more of the parameters. Selection software is responsive to the operator for permitting the operator to select a parameter and for defining an additional parameter from the plurality of parameters. The defined parameter is a function of the operator selected parameter. Analysis software applies the rules to the defined parameter and generates one or more recommended parameters from the plurality of parameters. The recommended parameter is a function of the defined parameter. Display software provides a display corresponding to the selected and defined parameters and corresponding to one or more recommended parameters such that the one or more recommended manufacturing parameters define parameters for the embroidery design using the embroidery machine.

In another form, the invention comprises a method for assisting an operator of an embroidery machine in analyzing an embroidery design using a knowledge base of parameters relating to embroidery designs and a rules base of rules interrelating the parameters. The method comprises the steps of designating selected and defined parameters relating to the embroidery design where the defined parameter is a function of the selected parameter; applying the rules to the defined parameter; generating one or more recommended parameters as a function of the application of the rules to the selected and defined parameters; and displaying the selected and defined parameters and the one or more recommended parameters such that the one or more recommended parameters define parameters for the embroidery design using the embroidery machine.

In another form, the invention includes a system for assisting an operator in analyzing an embroidery design which will be used by an embroidery machine to create an embroidered fabric. The system comprises a personal computer which includes a memory which contains a knowledge base of parameters relating to embroidery designs and a memory of a rules base of rules which interrelate two or more of the parameters. The system also comprises a processor that executes selection software responsive to the operator for permitting the operator to select a parameter and for defining an additional parameter. The defined parameter is a function of the operator selected parameter. Analysis software applies the rules to the defined parameter and generates one or more recommended parameters as a function of the defined parameter. Display software displays the selected and defined parameters and the one or more recommended parameters such that the one or more recommended parameters define parameters for the embroidery design using the embroidery machine.

This expert system and method of the invention has a number of advantages over the prior art. The expert system and method provide direction and guidance to an operator of an embroidery machine to enable the operator to quickly, efficiently and effectively select parameters relating to an embroidery design to be created as an embroidered fabric so that the operator can effectively produce a quality embroidered fabric from the embroidery design.

Other objects and features will be in part apparent and in part pointed out hereinafter.

BRIEF DESCRIPTION OF THE DRAWINGS AND APPENDIX

Figure 1:
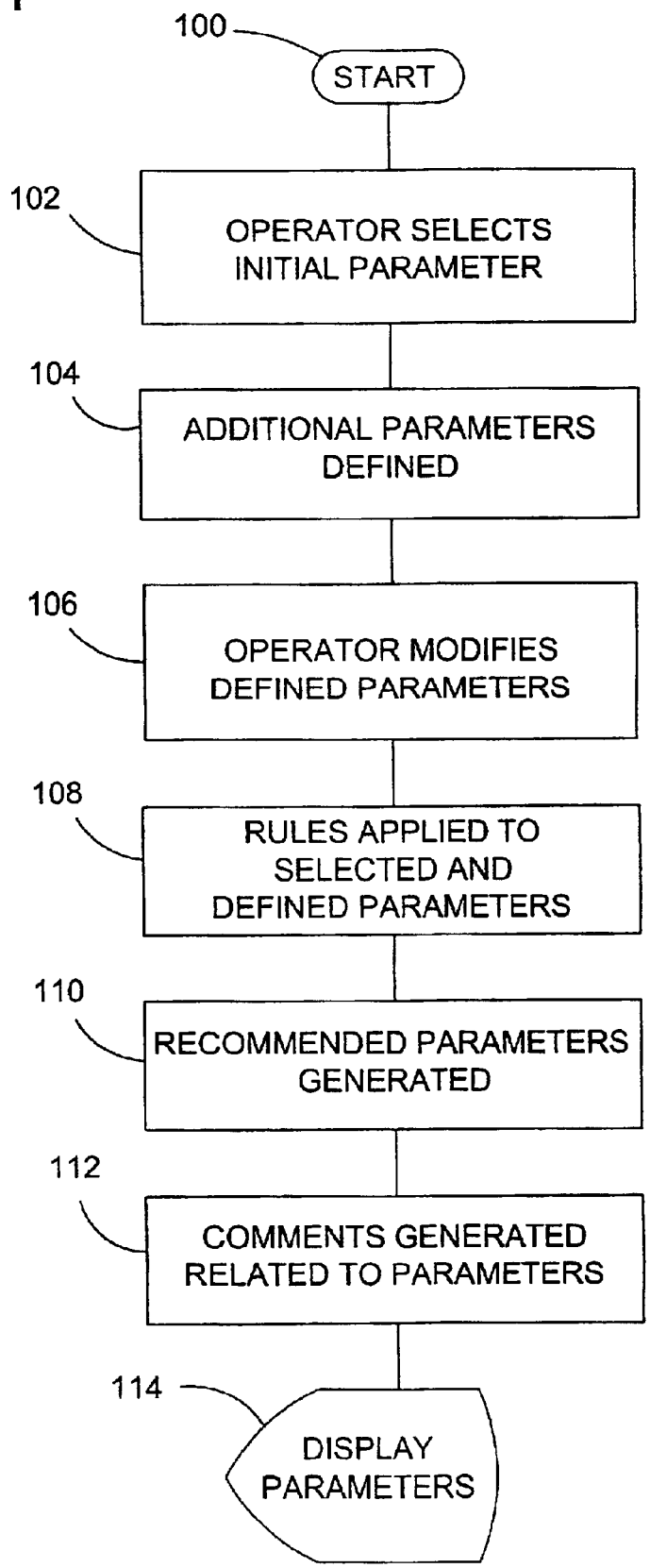
FIG. 1 is an schematic diagram of a flow chart for illustrating one preferred embodiment of the method and operation of the expert system of the invention.

Computer Program Listing Appendix is an exemplary listing of one preferred embodiment of a software program according to the invention. As noted above, it is included with this Application on a CD-ROM.

Corresponding reference characters indicate corresponding parts throughout the drawings.

DETAILED DESCRIPTION OF PREFERRED EMBODIMENTS

One purpose of the expert system and method of this invention is to allow operators who wish to produce an embroidered fabric from an embroidery design to have access to a knowledge base of parameters relating to the embroidery design and a rules base of rules for interrelating two or more of the parameters. The system and method interact with the operator and help the operator produce a quality embroidered fabric from the embroidery design. Generally, the operator will interact with an expert system and/or method which contains analysis software that allows the system to evaluate various combinations of selected and defined parameters based on the rule base. The invention assists the operator in selecting a compatible combination of parameters from a plurality of parameters including parameters from the categories of: hooping technique, stabilization technique, topping material, backing material, thread weight, thread type, needle type, needle size, embroidery density, project/fabric type, fabric thickness, fabric density, fabric stretch and design size.

The expert system and method of the invention analyzes the selected and defined parameters and recommends to the operator additional parameters for a quality embroidered fabric from an embroidery design. Additionally, the system provides the operator with comments related to the selected, defined and/or recommended parameters to provide the operator with additional information with regard to the application of the various parameters. The system may also provide the operator with photographs or multimedia presentations associated with one or more of the selected, defined and/or recommended parameters.

FIG. 1 is an schematic diagram of a flow chart for illustrating one preferred embodiment of the method and operation of the expert system of the invention. The expert system and method of this invention starts at step 100 with the initiation of the program. In step 102 the operator selects an initial parameter referred hereinafter as the selected parameter. The selected parameter could be any parameter associated with the creation of an embroidered fabric from an embroidery design. For instance, the selected parameter could be a project/fabric type of cotton/polyester woven.

In a next step 104 the software defines one or more additional parameters referred to as the defined parameters. In this step, the expert system of this invention designates one or more additional defined parameters from a plurality of parameters which are a function of the operator selected parameter of step 102. Preferably, both the selected parameter selected by the operator at step 102 and the defined parameters defined at step 104 are parameters that are contained in a knowledge base which contains a plurality of parameters related to embroidery design. For example, where the selected parameter selected by the operator in step 102 is cotton/polyester woven, the parameters designated as the defined parameters in step 104 could be a medium fabric thickness and no fabric stretch. In an optional step 106, the system provides the operator the ability to modify the defined parameter as designated by the expert system in step 102. For example, where the selected parameter is cotton/polyester woven and the defined parameters are medium fabric thickness and no fabric stretch, the operator has the opportunity to select a modified defined parameter for the fabric thickness and/or the fabric stretch. The operator could select a heavy fabric thickness rather than the system designated defined parameter of medium fabric thickness.

In a next step 108, the rules base of rules is applied to the selected and the defined parameters. The rules base is a collection of rules that interrelate two or more of parameters in the embroidery process. The rules provide the various interrelationships between parameters and are preferably based on the experience of experts in the field of the art. The rules step 108 receives as input the selected parameter and the defined parameters, the latter either being as designated by step 104 or as modified by the operator in step 106. Based on the application of the rules to the selected parameter and the defined parameters, step 110 generates the recommended parameters which are a function of the defined parameter. These one or more recommended parameters are additional parameters that will assist the operator and provide direction for the creation of an embroidered fabric from an embroidery design. Where the selected parameter is cotton/polyester woven and the defined parameters are medium fabric thickness and no fabric stretch, the recommended parameters could include an embroidery needle type, a needle size of 11–12, a thread weight of 40 weight, and a tear-away backing type.

A next optional step 112 generates comments that are a function of the selected parameter, the one or more defined parameters and/or the one or more recommended parameters. The comments provide general embroidery parameter and process application comments intended to assist the operator in applying the parameters during the embroidery process and the creation of a quality embroidered fabric from an embroidery design. A final step 114 displays the one or more defined and one or more recommended parameters. The display step 114 also includes the displaying of any related text comments, photographs, or multimedia presentations if available. The display step 114 could also provide a printout of the parameters and/or the comments, or the storage of the information in a memory file or on a memory media such as a floppy-disk or CD-ROM.

As noted, FIG. 1 is only one embodiment of the inventions process and other embodiments are contemplated. Additionally, the examples provided are only exemplary and it is contemplated that other embodiments would be based on other selected, defined and/or recommended parameters.

Figure 2:
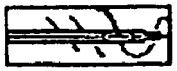
FIG. 2 is a screen shot display according to one embodiment of the invention wherein the selected parameter is the project/fabric type and wherein the defined parameters are fabric thickness and fabric stretch.

FIG. 2 provides a screen shot display according to one embodiment of the invention wherein the selected parameter category is the project/fabric type and wherein the defined parameters are fabric thickness and fabric stretch. In FIG. 2 the screen shot is entitled "Project Advisor." The screen initially provides a prompt 201 to the operator to select a project/fabric type. From this prompt 201, the operator is provided the ability to select a selected parameter for the project/fabric type from the pull down menu 202. In this illustrated example, the operator has chosen cotton/polyester woven. Next, the screen shot displays the defined parameters that are designated by the expert system based on the operator's selection of cotton/polyester woven in menu 202. In this example, the expert system provides defined parameters of fabric thickness 204 and fabric stretch 205. The expert system designates the defined parameters in pull down menus 206 and 207. In this instance, the screen shot displays the defined parameter of medium fabric thickness 206 and no fabric stretch 207.

Next, as prompted by the expert system as shown on the screen shot at 203, the operator has the ability to modify the defined parameters as designated by the system in pull down menu 206 for fabric thickness and pull down menu 207 for fabric stretch. While not shown in FIG. 2, as examples of this capability, the operator has the ability to modify the defined parameter medium fabric thickness 206 by selecting in the pull down menu 206 a heavy fabric thickness or by selecting in the pull down menu 207 a 10 percent fabric stretch.

Referring again to FIG. 2, based on the selected parameter of cotton/polyester woven 202 and the defined parameters of medium fabric thickness 206 and no fabric stretch 207, the expert system provides the operator with recommendations 208. The recommended parameters are the embroidery needle type 209 and the needle size of 11–12 210. Additional recommended parameters include the thread weight of 40 weight 211 and tear-away backing type 212.

Finally, the screen shot of FIG. 2 provides a project notes field 220 which provides the operator with comments that contain additional information related to the application of the selected parameter, the defined parameter, and the one or more recommended parameters associated with the creation of an embroidered fabric from an embroidery design. As shown in FIG. 2, text comments are associated the cotton/polyester woven 202, the medium fabric thickness 206 and with an unspecified hooping technique parameter. The hooping technique parameter was not a selected, defined or recommended parameter. However, in this example of a screen shot for this expert system, the comment provided by the expert system provides the operator with information associated with the hooping technique in the project notes field 220 that will assist the operator in the creation of the quality embroidered fabric from an embroidery design. In this example, the project notes 220 includes a comment that "When hooping, remember to make sure the fabric is 'drum tight.'" (See Computer Program Listing Appendix on CD-ROM).

In other embodiments of this invention, other screen shots would show other parameters that would be prompted as the initial selection parameter in prompt 201, as the defined parameters of fabric thickness 204 and fabric stretch 205, as the parameters displayed in the pull down menus of 202, 206 and 207, and as the recommended parameters 208. These parameters could be any parameters from the category of parameters including hooping technique, stabilization technique, topping material, backing material, thread weight, thread type, needle type, needle size, embroidery density, project/fabric type, fabric thickness, fabric density, fabric stretch and design size.

Additionally, in another embodiment of this invention, the operator may be presented with photographs or multimedia presentations in the screen shot that also assist the operator in applying the parameters and in the creation of the embroidered fabric.

Figure 3:
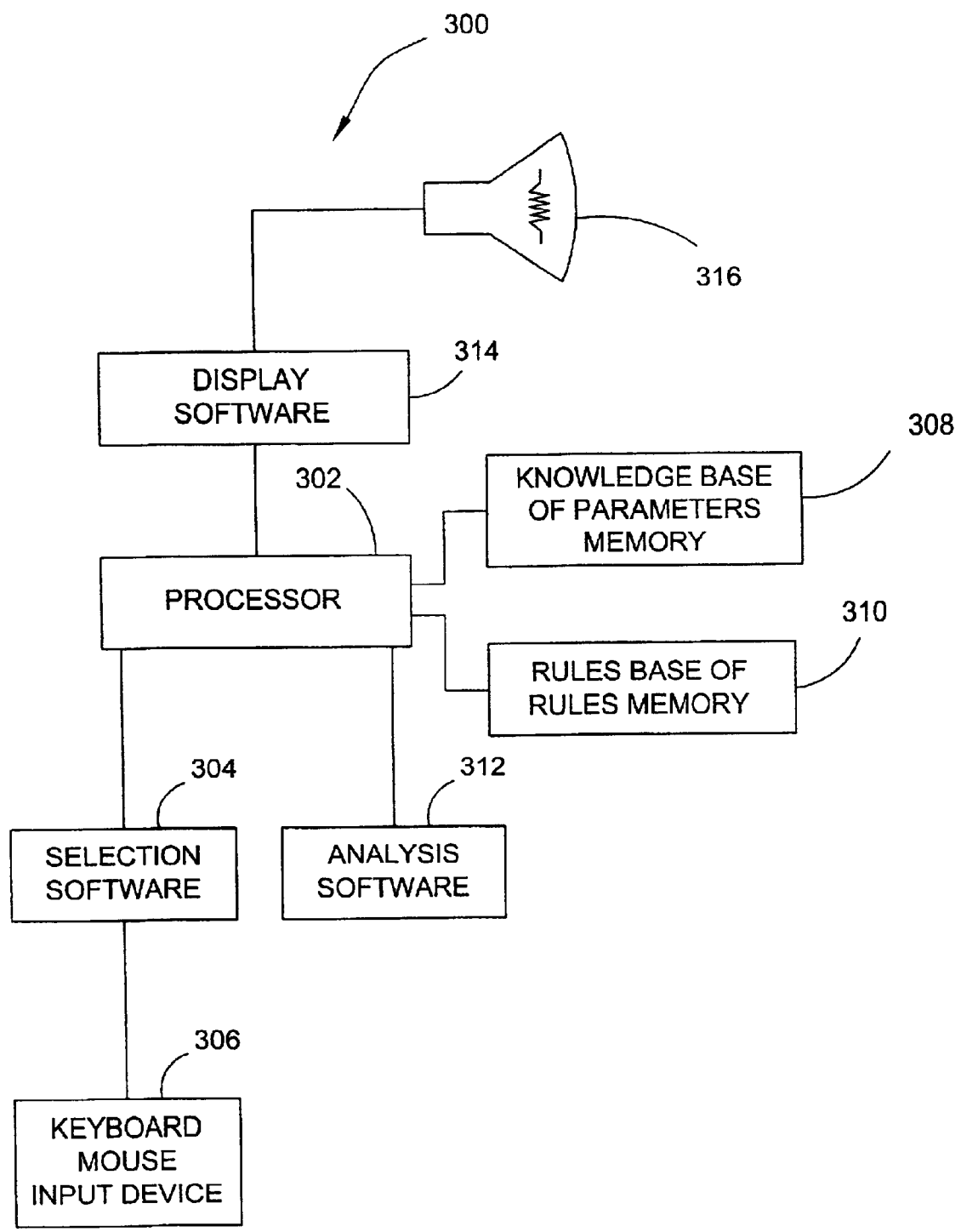
FIG. 3 is a block diagram of the expert system of the invention illustrating one embodiment of the components of the personal computer and the software of the expert system of the invention.

FIG. 3 is a block diagram of the expert system of the invention illustrating one embodiment of the components of the personal computer and the software of the expert system of the invention. The invention includes a personal computer 300 with a processor 302. The processor 302 is connected with memory 308 and 310. A knowledge base of parameters is provided in memory 308 which includes a plurality of parameters related to embroidery designs. This list of parameters includes parameters in the categories including hooping technique, stabilization technique, topping material, backing material, thread weight, thread type, needle type, needle size, embroidery density, project/fabric type, fabric thickness, fabric density, fabric stretch and design size. The knowledge base of parameters memory 308 may also contain comments, photographs, or multimedia presentations which are a function of one or more of the parameters. The knowledge base of parameters memory 308 may have stored in its memory stock digital photographs or multimedia presentations of various details related to a particular type of fabric or hooping technique. For example, where the expert system recommends a particular hooping technique, a photograph or multimedia presentation of the particular technique is stored in the memory and would be available for display to the viewing operator. Also connected to the processor 302 is a rules base of rules memory 310. A rules base of rules interrelates two or more of the parameters based on the experience of experts in the field of the art.

Additionally, the processor 302 is connected to selection software 304, analysis software 312 and display software 314. The selection software 312 assists the operator in selecting a selected parameter and designates one or more related defined parameters from the plurality of parameters. Additionally, the selection software 312 enables the operator to modify the defined parameters as designated by the selection software 312. The analysis software 312 applies the rules to the defined parameters and generates one or more recommended parameters as a function of the defined parameter. The display software 314 provides a display 316 corresponding to the selected parameter, the defined parameter and the one or more recommended parameters. The display software may also provide for the display 316 of comments, photographs, or multimedia presentations which are a function of the selected parameter, the defined parameter, and/or the one or more recommended parameters. These comments, photographs or multimedia presentations may be obtained from the knowledge base of parameters memory 308 or from other sources.

Interconnected to the selection software 304 is one or more input devices. In FIG. 3 the input devices are shown as a keyboard or mouse input device but it is contemplated that any input device to a personnel computer 300 would be suitable for the purpose of an operator providing the selection of the selected parameter and the modification of the one or more defined parameters. Finally, interconnected to the display software 314 is a display device 316. In FIG. 3 this display device 316 is shown as a computer display. However other output display devices could include providing the parameter and comment information to a printer or to a memory device such as a floppy disk or a CD-ROM.

In other embodiments, processes and function described above may be performed by other software configurations, software modules or on an integrated basis. The identification of the software and memory components provided in FIG. 3 are only one embodiment of this invention and other embodiments using different software and memory arrangements is contemplated by this invention.

In operation, the operator starts the expert system and method by opening the expert system screen shot as depicted in FIG. 2. The operator is prompted in step 102 by the selection software 304 to select an initial selected parameter such as the project/fabric type 201. The operator selects the initial selected parameter from the pull down menu 202. These parameters are stored on the system in the knowledge base of parameters memory 308. In step 104, the selection software 304 designates the defined parameters which are a function of the operator selected parameter of step 102. In step 106, the selection software 304 enables the operator in pull down menus 206 and 207 to modify the system designated defined parameters. In step 108, once the operator either modifies the defined parameter or chooses to accept the system designated defined parameters, the analysis software 310 applies the rules base of rules from the rules base of rules memory 310 to the selected and defined parameters and generates in step 110 the recommended parameters. The recommended parameters are displayed on the screen as recommendations 208 as enabled by the display software 314 and on the display 316. Additionally, the display software 314 provides on the display 316 associated project notes 220 which may include comments as provided in step 112. Additionally, photographs or multimedia presentations may also be provided by the processor 302 to the display software 314 for display on the display 316.

Annotated Description of the Computer Program Listing Appendix on CD-ROM

The Computer Program Listing Appendix on CD-ROM is an exemplary listing of one preferred embodiment of a software program. The expert system and method of the invention assists an operator in creating an embroidered fabric from an embroidery design.

The expert system includes the knowledge base of parameters (see Computer Program Listing Appendix on CD-ROM, lines 1–130) related to embroidery designs. The expert system also includes a rules base of rules (see Computer Program Listing Appendix on CD-ROM, lines 132–211) that interrelate two or more of the parameters. In addition, the expert system may include selection software (Computer Program Listing Appendix on CD-ROM, lines 212–213) which provides the operator the ability to select the selected parameter and for the expert system to designate the defined parameters based on the operator's selection of the project/fabric type. Additionally, the selection software provides the operator the ability to modify the designated defined parameters.

The expert system includes analysis software (Computer Program Listing Appendix on CD-ROM, lines 214–288 and 290–324) that applies rules to the selected and defined parameters. The rules are based on the experience of experts in the field of the art. The expert system also provides comments, photographs or multimedia presentations which are a function of the selected parameter, the defined parameter and/or one or more recommended parameters. In one embodiment, the comments are contained in the knowledge base or parameters and retrieved by the analysis software to include in the recommendation or for forwarding to the display software. The expert system of this invention also includes display software (Computer Program Listing Appendix on CD-ROM, lines 131, 289, and 325–326) for providing a display corresponding to recommendations resulting from the application of the rules to the designated parameters.

Referring again to Computer Program Listing Appendix on CD-ROM, it can be seen that lines 1–59 specify the text string resources used for the knowledge base of parameters, lines 60–64 specify the general purpose string resources, lines 65–72 specify the hooping resources, lines 73–84 specify the stabilization resources, lines 85–88 specify other string resources, lines 89–102 specify needle and thread string resources, and lines 103–126 specify the project string table indexes. In addition, lines 137–209 specify the sample code function for designating a recommended parameter where there is no operator modification to the defined parameters. Lines 214–278 provide the rules for designating a recommended parameter where an operator modifies the defined parameters.

Referring again to FIG. 2, a screen shot 200 provides one embodiment of the invention as described above. In this embodiment, the operator selected "cotton/polyester woven" as the project/fabric type 202 (Computer Program Listing Appendix on CD-ROM, line 5). As a result, the selection software designates the fabric thickness 204 as medium 206 and the fabric stretch 205 as none 207.

Once the rule base is applied, the analysis software recommends 208 the type of needle as an embroidery needle 210 and recommends a size of the needle as size 11–12 210 (Computer Program Listing Appendix on CD-ROM, line 93). The operator may modify the defined parameter of fabric thickness 206 and/or fabric stretch 207 by modifying the defined parameters. For example, if the thickness of the cotton/polyester woven project was modified to heavy, based on the rule base of rules, the expert system could recommend the needle type as been a "jean needle" (Computer Program Listing Appendix on CD-ROM, lines 219–220) rather than an embroidery needle. The analysis software also recommends a 40 weight thread weight (Computer Program Listing Appendix on CD-ROM, line 98). Finally, the display software presents comments 220 corresponding to the selected, defined and/or recommended parameters. The comments shown in FIG. 2 project notes 220, are lines 4–8 of Computer Program Listing Appendix on CD-ROM.

The exemplary computer code as provided in Computer Program Listing Appendix on CD-ROM is only one embodiment of the possible forms of this invention as provided by computer code. In other embodiments of this invention, computer program implementations of FIG. 3 and Computer Program Listing Appendix on CD-ROM can be written in different codes, different software code modules or on a fully integrated basis.

In view of the above, it will be seen that the several objects of the invention are achieved and other advantageous results attained.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

What is claimed is:

1. A computer-implemented system for assisting an operator of an embroidery machine to make an embroidered fabric from an embroidery design using the embroidery machine, said computer-implemented system comprising:

a knowledge base of parameters for making the embroidered fabric from the embroidery design wherein the parameters are in at least one of the following categories: hooping technique, stabilization technique, topping material, backing material, thread weight, thread type, needle type, needle size, embroidery density, project/fabric type, fabric thickness, fabric density, fabric stretch and design size;

a rules base of rules interrelating two or more of the parameters;

selection software responsive to the operator for permitting the operator to select a parameter from the parameters and for defining a parameter for making the embroidered fabric wherein the defined parameter is a function of the operator selected parameter;

analysis software for applying the rules to the defined parameter and for generating one or more recommended parameter for making the embroidered fabric, wherein the one or more recommended parameters is a function of the defined parameter; and display software for providing a display corresponding to the selected and defined parameters and corresponding to the one or more recommended parameters such that the one or more recommended parameters define parameters for making the embroidered fabric from the embroidery design using the embroidery machine.

2. The computer-implemented system of claim 1 wherein the selected parameter is project/fabric type; wherein the selection software designates two or more defined parameters; and wherein the defined parameter comprises fabric thickness and fabric stretch.

3. The computer-implemented system of claim 2 wherein the operator may modify the defined parameter.

4. The computer-implemented system of claim 1 wherein the operator may modify the defined parameter and wherein the analysis software applies the rules to the modified defined parameter.

5. The computer-implemented system of claim 2 wherein the knowledge base includes comments, photographs or multimedia presentations which are a function of the selected parameter, the defined parameter, and/or the one or more of the recommended parameters and wherein the display software displays the provided comments, photographs or multimedia presentations.

6. A method for assisting an operator of an embroidery machine to make an embroidered fabric from an embroidery design using the embroidery machine using a knowledge base of parameters and a rules base of rules interrelating the parameters, said method comprising the steps of:

designating selected and defined parameters for making the embroidered fabric from the embroidery design, wherein said selected and defined parameters are in at least one of the following categories: hooping technique, stabilization technique, topping material, backing material, thread weight, thread type, needle type, needle size, embroidery density, project/fabric type, fabric thickness, fabric density, fabric stretch and design size, wherein the defined parameter is a function of the selected parameter;

applying the rules to the selected and defined parameters;

generating one or more recommended parameters for making the embroidered fabric, wherein the one or more recommended parameters is a function of the application of the rules to the defined parameter; and displaying the selected and defined parameters and the one or more recommended parameters such that the one or more recommended parameters define parameters for making the embroidered fabric from the embroidered fabric using the embroidery machine.

7. The method of claim 6 wherein the selected parameter is the project/fabric type; further comprising the step of designating two or more defined parameters; and wherein the defined parameters comprise fabric thickness and fabric stretch.

8. The method of claim 7 further comprising modifying the defined parameter.

9. The method of claim 6 further comprising modifying the defined parameter.

10. The method of claim 6 further comprising providing comments, photographs, or multimedia presentations which are a function of the selected parameter, the defined parameter, and one or more recommended parameters and displaying the provided comments, photographs or multimedia presentations.

11. A system for assisting an operator of an embroidery machine to make an embroidered fabric from an embroidery design using the embroidery machine, said system comprising:

a personal computer including:
a knowledge base memory of parameters for making the embroidered fabric, wherein the parameters are in at least one of the following categories: hooping technique, stabilization technique, topping material, backing material, thread weight, thread type, needle type, needle size, embroidery density, project/fabric type, fabric thickness, fabric density, fabric stretch and design size; and
a rules base memory of rules interrelating the parameters;

and including a processor for executing:
selection software responsive to the operator for permitting the operator to select a parameter and for defining an additional parameter for making the embroidered fabric wherein the defined parameter is a function of the operator selected parameter;
analysis software for applying the rules to the defined parameter and for generating one or more recommended parameters for making the embroidered fabric, wherein the one or more recommended parameters is a function of the defined parameter; and
display software for providing a display corresponding to the selected and defined parameters and corresponding to the one or more recommended parameters such that the one or more recommended parameters define parameters for making the embroidered fabric from the embroidery design using the embroidery machine.

12. The system of claim 11 wherein the selected parameter is project/fabric type; wherein the selection software designates two or more defined parameters; and wherein the defined parameters comprise fabric thickness and fabric stretch.

13. The system of claim 12 wherein the operator may modify the defined parameter.

14. The system of claim 11 wherein the operator may modify the defined parameter and wherein the analysis software applies the rules to the modified defined parameter.

15. The system of claim 11 wherein the knowledge base includes comments, photographs, or multimedia presentations which are a function of the selected parameter, the defined parameter, and/or one or more of the recommended manufacturing parameters and wherein the display software displays the provided comments, photographs, or multimedia presentations.

* * * * *